March 9, 1971  P. N. DUNHAM  3,568,227
INFLATABLE CUSHION AND APPARATUS FOR MAKING SAME
Filed April 10, 1968  2 Sheets-Sheet 1
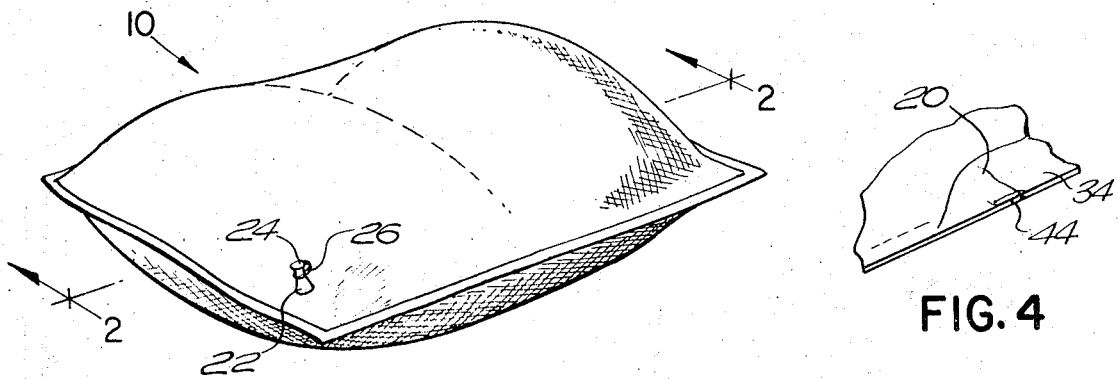
FIG. 1
FIG. 4
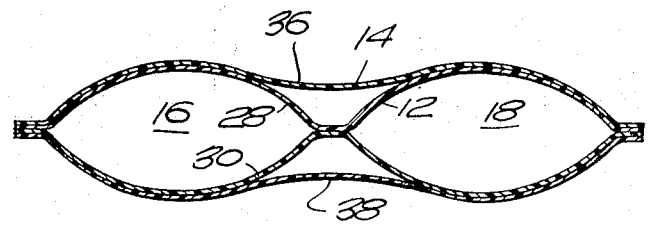
FIG. 2
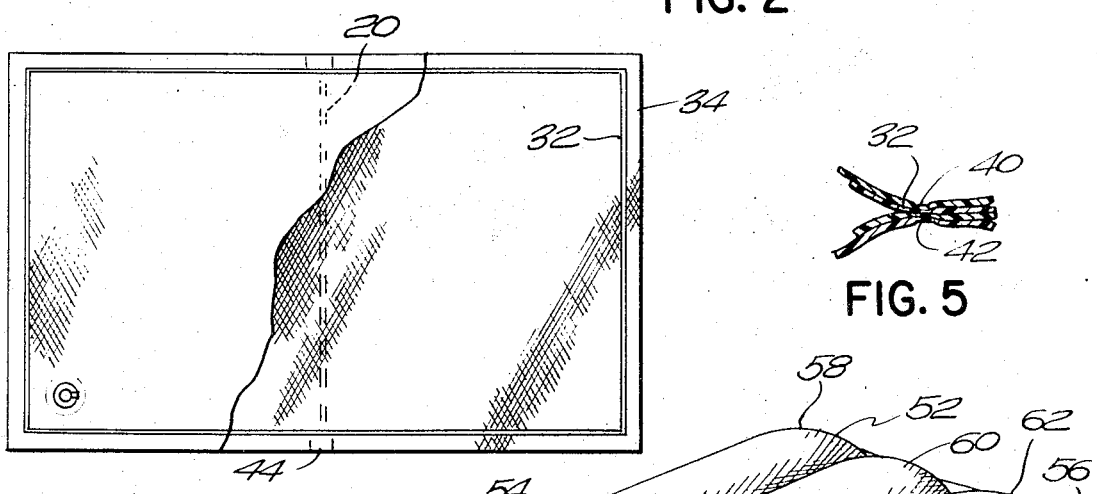
FIG. 3
FIG. 5
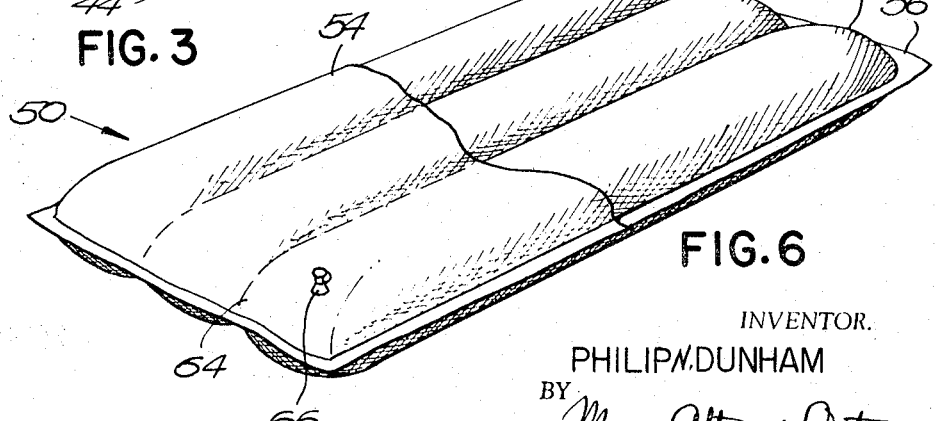
FIG. 6
INVENTOR.
PHILIP N. DUNHAM
BY
Morse, Altman + Oates
ATTORNEYS March 9, 1971   P. N. DUNHAM   3,568,227
INFLATABLE CUSHION AND APPARATUS FOR MAKING SAME
Filed April 10, 1968   2 Sheets-Sheet 2
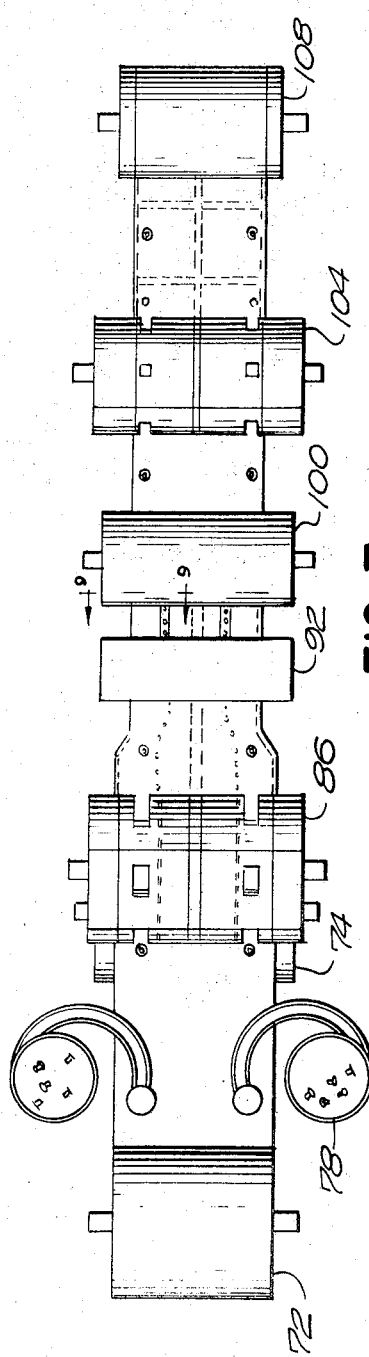
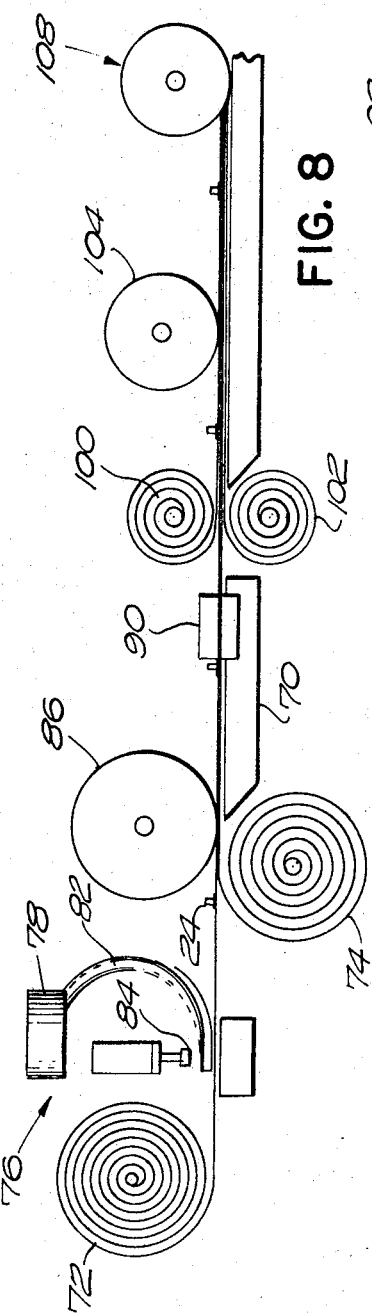
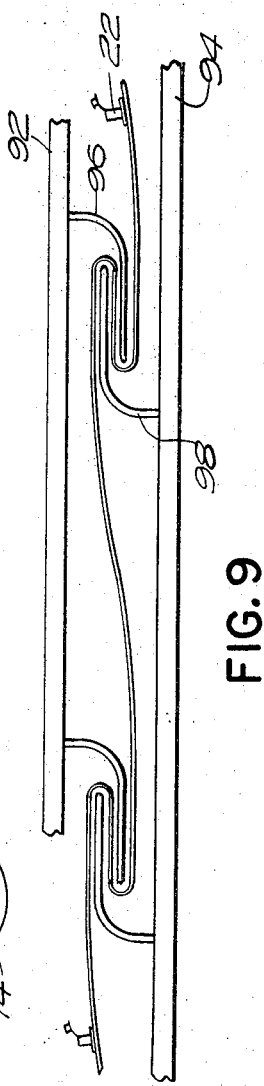
*INVENTOR.*
PHILIP N. DUNHAM
BY
*ATTORNEYS*

United States Patent Office 3,568,227
Patented Mar. 9, 1971

3,568,227
INFLATABLE CUSHION AND APPARATUS FOR MAKING SAME
Philip N. Dunham, Biddeford, Maine, assignor to Philips Maine Corporation, Biddeford, Maine
Filed Apr. 10, 1968, Ser. No. 720,093
Int. Cl. A47c 27/08
U.S. Cl. 5—349    3 Claims

ABSTRACT OF THE DISCLOSURE

An inflatable cushion is of double-walled construction, the inner wall being a bladder of flexible, imperforate and heat-sealable material, such as polyethylene, and the outer wall, in the preferred mode, being a non-woven paper fabric bonded to the bladder only about the selvedge of the bladder. The bladder is formed with at least two interconnecting cells by means of transverse spot seals. The bladder is pleated parallel to the cell lengths to shorten the length of the bladder in a direction perpendicular to the spot seal line. The outer skin is dimensioned to fit over the shortened bladder whereby, when the bladder is inflated, the outer skin fits snugly over the bladder in all directions. The two walls provide counter forces of compression and tension when weight is applied to the cushion. By employing low-cost polyethylene for the bladder and a non-woven paper fabric on the outer layer a very inexpensive cushion is provided which may be discarded after a short period of use.

An apparatus for manufacturing the cushion includes a pair of rolls of heat sealable material, such as polyethylene, a nozzle applying station adapted to attach air nozzles at selected positions along the web which is indexed horizontally, a heat sealing roll to join the two superimposed webs along heat seal lines, pleating guides to gather the web and a pair of oppositely mounted rolls of non-woven fabric to apply the outer skin. Another heat seal roller is provided for marginally bonding the fabric to the bladder and a cut off station separates the completed units from the web.

BACKGROUND OF THE INVENTION (1) Field of the invention

This invention relates generally to cushion products and more particularly is directed towards an inflatable, double-walled cushion of laterally stable, comfortable construction which in its preferred mode is fabricated of low-cost materials to permit its use as a disposable pillow for hospitals and the like. The invention is also directed towards a novel apparatus for producing inflatable cushions.

(2) Description of the prior art

There have been available various types of cushions of both the inflatable and disposable variety but these have not been entirely satisfactory for various reasons. For example, disposable stuffed cushions which are usually relatively expensive by reason of the stuffing material and the high cost involved in shipping bulky goods, are rather impractical in large numbers. Inflatable cushions heretofore have been generally uncomfortable, particularly for long periods since a simple inflated bladder does not give proper support to the head. The head tends to bury itself in a pillow if inflated at too low a pressure and at higher pressures the head or pillow tends to be displaced. Accordingly, it is an object of the present invention to provide improvements in inflatable cushions and more particularly to provide a comfortable, low-cost, disposable cushion having superior comfort characteristics and adapted to be mass produced at minimum cost. Another object of this invention is to provide novel apparatus for producing inflatable cushions automatically and at a high rate of speed.

SUMMARY OF THE INVENTION

This invention features an inflatable cushion of double-wall construction. This cushion is fabricated with an inner bladder of a flexible, imperforate and heat-sealable material, such as polyethylene, defining at least a pair of parallel chambers. The outer wall of the cushion in the preferred embodiment is fabricated from a non-woven paper fabric which is bonded marginally to the bladder about the bladder selvedge. With this construction, a unique supporting effect is provided to a weight applied to the cushion by reason of the counter-working forces of compression and tension provided by the cooperating bladder and outer skin. The double-wall construction also enhances the lateral stability of the cushion and it may be fabricated at a cost so low as to be readily disposable after a limited period of use. The pillow, being inflatable, may be shipped in a flat deflated condition thereby greatly reducing shipping costs and may be quickly inflated when ready for use. As another feature of the invention, the bladder is gathered between adjacent cells to eliminate the usual shrinking effect which occurs when a multi-cell bladder is inflated. The result is that no wrinkles develop in the outer skin when the cushion is inflated.

This invention also features high speed machinery for producing inflatable cushions at a high rate of productivity.

BRIEF DESCRIPTION OF THE DRAWINGS

FIG. 1 is a view in perspective of an inflatable, disposable pillow made according to the invention, FIG. 2 is a cross-sectional view along the line of 2—2 of FIG. 1, FIG. 3 is a top plan view of the FIG. 1 pillow in a deflated condition, FIG. 4 is a fragmentary detail view showing the pleating of the FIG. 1 pillow, FIG. 5 is a detail sectional view on an enlarged scale showing the bonding connection between the bladder and the outer skin, FIG. 6 is a view in perspective, partly broken away, of an inflatable mattress made according to the invention, FIG. 7 is a top plan view of an apparatus made according to the invention for producing inflatable cushions, FIG. 8 is a view in side elevation thereof, and FIG. 9 is a fragmentary cross-sectional view taken along the line 9—9 of FIG. 7 showing the pleating apparatus.

DESCRIPTION OF THE PREFERRED EMBODIMENTS

Referring now to the drawings and particularly to FIGS. 1 through 5 there is illustrated an inflatable pillow 10 of generally rectangular outline and formed with an inner bladder 12 and an outer skin 14, the bladder 12 being divided into a pair of cells 16 and 18, generally elliptical when inflated, by means of a transverse line of heat seal spots 20. The heat seal spots 20 join the opposing walls of the bladder and are connected at closely spaced intervals along the line to form a series of passages between the two cells. A valve element 42, preferably of a relatively soft heat sealable plastic, is bonded to the bladder at one corner therof and projects through an opening in the skin 14. Typically, the valve 22 is provided with a detachable cap connected to the valve stem by means of a keeper 26.

The bladder 12 is formed from a flexible, imperforate, heat-sealable material such as polyethylene. In practice, laminated 1 mil polyethylene has been found to provide a very satisfactory, low-cost, yet durable bladder which is readily fabricated by heat sealing techniques. Other materials may also be used to advantage.

The bladder 12 is formed by a pair of superimposed panels 28 and 30 of the heat sealable plastic film bonded together about their margins along heat seal lines 32 with the cells 16 and 18 being formed by the transverse line of heat sealed spots 20. The marginal heat seal line 32 forms a selvedge 34 of perhaps ½" in width more or less about the bladder. The outer skin 14 of the cushion, which skin in the preferred mode is of an inexpensive non-woven fabric, is comprised of panels 36 and 38 heat sealed about their margins along heat seal lines 40 and 42 to the bladder selvedge 34 outwardly of the bladder heat seal line 32.

The outer skin 14 of non-woven fabric is a relatively soft, moisture absorbent material available in a variety of compositions. The non-woven fabric may be entirely composed of paper or cotton fibers formed by an entangling process without binding agents. Such material is highly absorbent. Other non-woven fabrics are made from cellulosic fibers having high wet strength and yet are absorbent and soft and may be heat sealed to the bladder without any other bonding agent. Non-woven fabrics of the foregoing type are available under various trademarks such as "Webril," "Webline," "Weblox" and "Lexon" from the Kendall Company of Walpole, Mass. The material is low in cost, light in weight having something of the characteristics of both cloth and paper tissue. The material is strong in both a wet or dry condition making it particularly suitable as a low-cost pillow cover.

According to the invention the bladder 12 is preshortened in the direction perpendicular to the transverse heat seal line 20 before the outer fabric skin 14 is bonded to the bladder. As best shown in FIG. 4 the pre-shortening is achieved by gathering the bladder as indicated by the fold or pleat 44 in FIG. 4. In practice, the flat dimensions of the bladder are reduced on the order of 10 or 15% in the direction perpendicular to the transverse line of spots 20. The outer covering is cut to fit the reduced flat dimensions of the bladder and bonded in that condition. When the bladder is inflated and the outer covering becomes slightly smaller than the inflated circumference of the bladder thus producing a certain lateral tension on the cover. By pre-shortening the bladder in this fashion, the inflated dimensions of the bladder are close to its flat dimensions. With a conventional multi-cell bladder there would be a substantial difference between the inflated dimensions and the flat dimensions by reason of the transverse shortening effect normally produced by inflating the cells. The use of the gathers in effect prevents the bladder from any substantial change in dimensions when inflated. The result is that the outer skin fits snugly over the bladder under both flat and inflated conditions.

The resulting pillow is sufficiently rugged and durable as to withstand considerable use yet is of such low-cost that it is economically disposable. The pillow would be very useful as a disposable item for hospitals, trains, busses and airplanes or the like where there is a continuing need for sanitary pillows. In view of the fact that the pillows are disposable, considerable savings are achieved over the use of conventional pillows the cases of which are expensive and require daily laundering and the pillow itself cannot be completely sterlized. With the present invention, pillows may be stored in a deflated sterile condition and when to be used, are inflated as by mouth, hand pump or compressed air pump and the soiled pillows are discarded.

One of the main features resulting from the pillow construction described above resides in the unique supportive effect provided by the cooperation of the bladder and the skin. In a conventional stuffed pillow, the head tends to bury itself in the material which offers very little resistance. Foam rubber pillows provide a certain amount of compression resistance in supporting the head but this is relatively small. With a simple inflatable bladder which may or may not be covered by an outer skin, the bladder offers purely compression resistance to support the head. If the bladder is inflated too much the head tends to roll or slide off the pillow and if the bladder is only partially inflated the head again tends to bury itself. With the present invention in which the outer skin is connected to the bladder only about the bladder margins and with the multi-cell construction a very superior effect is achieved. The outer skin is tensioned by means of the inflated bladder and provides support that may be compared to a hammock effect against the weight of the head. The bladder itself provides a compressive support while the snugly fitting outer fabric skin provides a tensioned support and these two counter forces cooperate to resist excessive depression of the pillow. The counter forces of compression and tension between the bladder and outer skin oppose the weight of the head and tend to multiply the stress area and distribute more evenly the supportive effect of the head and thereby eliminate localized pressure against the head. With the head supported by a uniform resisting pressure, the pillow remains comfortable for extended periods of use.

A further advantage of the cushion described above is that the outer skin and bladder cooperate to increase greatly the lateral stability of the cushion. This feature is particularly useful in connection with larger cushions such as an air mattress 50 illustrated in FIG. 6. In FIG. 6 the mattress is formed with an inner bladder 52 and an outer skin 54 which is connected to the bladder 52 only marginally along the bladder selvedge 56. In the illustrated embodiment the bladder 52 is made with three cells 58, 60 and 62 all formed by a longitudinal line of heat seal spots 64 similar to the line of heat seal spots 20 of FIG. 3 whereby the cells intercommunicate to permit the bladder to be filled by means of a single valve element 66. The bladder preferably is fabricated from a heat sealable, flexible, imperforate material such as polyethylene of suitable dimensions. Where the air mattress 50 is to be employed as a disposable item for hospitals and the like the outer skin 54 is then formed from the non-woven fabric described in connection with the FIG. 1 embodiment.

By reason of the greatly increased lateral stability provided by the double-wall construction the air mattress 50 may be modified for use as a surfing float for swimmers by substituting a flexible imperforate water proof skin such as polyethylene in place of the non-woven fabric skin mentioned above. In such a modification a second air valve element would be provided for the outer skin and both the inner bladder and outer skin would be inflated to double the safety of the float. Thus if a leak developed in either the inner bladder or outer skin only half of the buoyancy will be lost with little or no danger to the swimmer. As mentioned above the double wall construction greatly stiffens the mattress whereby the mattress will not tend to double up under the weight of the swimmer as is the case with a conventional inflatable air float. The mattress would thus be safer and more comfortable to use when swimming and would lend itself to better advantage for surfing.

Referring now to FIGS. 7, 8 and 9, there is illustrated an apparatus for producing inflatable cushions of the sort disclosed in FIGS. 1 through 6 automatically on a mass production basis. The apparatus is generally organized about a horizontal table 70 having upper and lower feed rolls 72 and 74 of a heat sealable plastic web such as polyethylene unwinding into superimposed relation. The upper roll 72 feeds its web first into a valve application station 76 comprising a feeder 78 adapted to deliver valves 80 down a chute 82 to a position directly above the web. A reciprocating heating die 84 is adapted to position and heat seal individual valves at selected points to the web as the web is indexed along by suitable drive means. In the illustrated embodiment two valve application stations 76 are provided, one on each side of the web, whereby two bladders are formed simultaneously side by side on the same web to be subsequently separated. From the valve application station the web, together with its valve, is carried into superimposed relation with the web fed from the roll 74, the two superimposed webs being fed under a rotary heat sealing roll 86 carrying heating elements 88 about its outer surface for heat sealing the webs to form the bladders. From the roll 86 the web is carried into a bladder pleating station 90 to form the folds 44 illustrated in FIG. 4. The pleating station, best shown in FIG. 9, comprises upper and lower transverse plates 92 and 94 each carrying a suitable number of forming elements 96 and 98. As shown, the upper element extends downwardly and inwardly while the lower element 98 extends upwardly and outwardly in opposing spaced relation to the element 96. The two elements generally define an S-shaped passage through which the bladder, still integral with the web, is fed. The elements 96 and 98 automatically form the desired gathers or pleats as the web weeds through the station. From the pleating station the bladders pass between upper and lower feed rolls 100 and 102 of outer skin material such as the nonwoven fabric described in connection with the FIG. 1 embodiment. The pleated bladder, now with the outer casing in position, is carried under a second heat sealing roll 104 having suitable heating elements 106 on its outer cylindrical surface for heat sealing the outer material to the bladder along its margins as previously mentioned. The completed cushions are then fed into a cut-off station 108 which may comprise a roll with heated cutting elements for separating individual cushions.

Having thus described the invention what I claim and desire to obtain by Letters Patent of the United States, is:

1. An inflatable cushion, comprising
  (a) a bladder of flexible imperforate heat sealable material formed with a peripheral selvedge and with opposing walls of the bladder joined along at least one transverse line to form multiple chambers, said bladder being gathered in a direction perpendicular to said transverse line,
  (b) a layer of non-woven fibrous material of corresponding size disposed over the outer surface of said bladder and heat sealed to it only about its selvedge, and
  (c) means for inflating said bladder.

2. An inflatable cushion according to claim 1 wherein said means is a valve bonded to said bladder.

3. An inflatable cushion, comprising
  (a) a bladder of flexible imperforate material with opposing walls thereof joined along at least one transverse line to form a plurality of cells, said material being gathered in a pleat along said line,
  (b) an outer skin of corresponding size disposed over the outer surfaces of said bladder and connected to it only about its periphery, and
  (c) means for inflating at least said bladder.

References Cited
UNITED STATES PATENTS

| | | | |
|---|---|---|---|
| 1,733,034 | 10/1929 | Tufenkjian | 5—348 |
| 3,017,642 | 1/1962 | Rosenberg et al. | 5—349 |

FRANCIS K. ZUGEL, Primary Examiner

A. M. CALVERT, Assistant Examiner

U.S. Cl. X.R.

5—339